(12) United States Patent
Cabrera

(10) Patent No.: US 8,075,314 B2
(45) Date of Patent: Dec. 13, 2011

(54) METHOD OF TEACHING THINKING SKILLS AND KNOWLEDGE ACQUISITION

(76) Inventor: Derek Cabrera, Ithaca, NY (US)

( * ) Notice: Subject to any disclaimer, the term of this patent is extended or adjusted under 35 U.S.C. 154(b) by 1043 days.

(21) Appl. No.: 11/856,793

(22) Filed: Sep. 18, 2007

(65) Prior Publication Data

US 2008/0187899 A1 Aug. 7, 2008

Related U.S. Application Data

(60) Provisional application No. 60/888,492, filed on Feb. 6, 2007.

(51) Int. Cl.
*G09B 19/00* (2006.01)

(52) U.S. Cl. ..................................................... 434/236

(58) Field of Classification Search .................. 434/107, 434/129, 168, 236, 237; 705/10, 11
See application file for complete search history.

(56) References Cited

U.S. PATENT DOCUMENTS

| | | | |
|---|---|---|---|
| 2,570,625 A | 10/1951 | Zimmerman et al. | |
| 3,461,574 A | 8/1969 | Larsen et al. | |
| 3,510,962 A | 5/1970 | Sato | |
| 3,726,027 A | 4/1973 | Cohen et al. | |
| 3,959,893 A | 6/1976 | Sigg | |
| 4,778,392 A | 10/1988 | Mitchell | |
| 4,836,787 A | 6/1989 | Boo | |
| D367,675 S | 3/1996 | Welch | |
| 5,554,062 A | 9/1996 | Goldsen | |
| 5,944,312 A | 8/1999 | Darneille | |
| 6,379,212 B1 | 4/2002 | Miller | |
| D474,864 S | 5/2003 | Allegretti | |
| 6,626,677 B2 * | 9/2003 | Morse et al. | 434/237 |
| 7,083,417 B1 * | 8/2006 | Liu et al. | 434/236 |
| 2002/0103774 A1 * | 8/2002 | Victor et al. | 706/11 |
| 2005/0287505 A1 * | 12/2005 | George | 434/236 |
| 2007/0122779 A1 * | 5/2007 | Siler | 434/219 |
| 2008/0193907 A1 * | 8/2008 | Pauwels | 434/322 |

OTHER PUBLICATIONS

Cabrera, D.A.; "Systems Thinking"; A Dissertation Presented to the Faculty of the Graduate School of Cornell University in Partial Fulfillment of the Requirements for the Degree of Doctor of Philosophy; 2006; Chapter 7; 44 pages.

* cited by examiner

*Primary Examiner* — Kurt Fernstrom

(74) *Attorney, Agent, or Firm* — Brown & Michaels, PC

(57) ABSTRACT

A method of teaching thinking skills and knowledge acquisition using an educational toy is disclosed. In a first step, a user chooses at least one idea variable. In a second step, the user chooses a process from a group having a distinctions process, a systems process, a relationships process, and a perspectives process. In a third step, the process is carried out on the idea variable. In a fourth step, the user determines whether any additional processes need to be carried out and if yes, the user returns to selecting a process.

6 Claims, 14 Drawing Sheets

METHOD OF TEACHING THINKING SKILLS AND KNOWLEDGE ACQUISITION

REFERENCE TO RELATED APPLICATIONS

This application claims one or more inventions which were disclosed in Provisional Application No. 60/888,492, filed Feb. 6, 2007, entitled "A TACTILE SYSTEM OF TOY-LIKE MANIPULATIVES INCLUDING AN ACTIVE THINKING BOARD AND CONTENT TOKENS AND CONTEXT BLOCKS THAT ENCODE FIVE COGNITIVE/THINKING RULES INTO THEIR FORM, FUNCTION, AND ORGANIZATION". The benefit under 35 USC § 19(e) of the United States provisional application is hereby claimed, and the aforementioned application is hereby incorporated herein by reference.

BACKGROUND OF THE INVENTION

1. Field of the Invention

The invention pertains to the field of teaching methods. More particularly, the invention pertains to a method of teaching thinking skills and knowledge acquisition using an educational toy.

2. Description of Related Art

Educational toys are often used to teach and facilitate learning. For example, U.S. Pat. No. 2,570,625, entitled "Magnetic Toy Blocks", discloses blocks with indicia, pictures, or letters to be arranged to correlate subjects by definite serial relationships—logical or reasonable in nature and meaningless or unreasonable in nature. The relationships are also shown through magnetism between the blocks.

U.S. Pat. No. 3,461,574, entitled "Educational Toy", discloses an educational toy with a plurality of polyhedra of different sizes and configurations. The polyhedra may be nested within one another.

U.S. Pat. No. 3,510,962, entitled "Molecular Structure Models", discloses polyhedra that are arranged in specific molecular arrangements to teach stereo-chemistry.

U.S. Pat. No. 3,726,027, entitled "Teaching Aid and Educational Toy", discloses a teaching aid and educational toy that includes a hollow box shaped as a cuboctahedron having it outer faces covered with sheets of fabric in various colors. In one embodiment, a plurality of illustration objects, such as letters or numbers are made of a fabric that adheres to the specific faces of the cuboctahedron when learning to associate objects with certain colors. Alternatively, at least one face of the box is open and the inner faces of the box are covered with materials of different textures so that a student may reach through the opening and touch a given inner face when learning to form word associations with the various textures.

U.S. Pat. No. 3,959,893, entitled "Educational Gaming Apparatus", discloses an educational gaming apparatus that consists of a set of numbered blocks and a single operator block. The numbered blocks have digits zero through nine on each of the faces and the operator block has one or more basic mathematical symbols of addition, subtraction, multiplication, or division. Individuals can then arrange the blocks in order, so that the uppermost faces of the blocks indicate a mathematical problem and its solution.

U.S. Pat. No. 4,778,392, entitled "Educational Block Set", discloses a block set where each of the sides include a similar pictorial depiction of an object, such as an animal or the like with a letter imprinted on the object, preferably in a portion of the object which bears a resemblance to the letter. The edges of each side of the block are colored, with each edge being a different color for promoting color awareness, with the like colored edges of adjacent blocks establishing a preferred orientation for pictorial and indicia alignment. The individual pictorial representations on adjacent surfaces of the same block are oriented in different orthogonal directions for enabling the reading of a word on the adjoined surfaces of adjacent blocks on at least one other of the adjoined surfaces of the blocks.

U.S. Pat. No. 5,554,062, entitled "Building Word Blocks", discloses a toy educational building block set having alphabetical and other indicia for word building. The building blocks are adapted to have letters selective secured to their surfaces to form alphabetical blocks using pegs. The blocks may be a cube, prism or larger structure. In one embodiment, the blocks are received on pegs that extend outward from a large polyhedron.

U.S. Pat. No. 5,944,312, entitled "Educational Game Apparatus for Learning Relationships Between Living or Non-Living Things", discloses a game apparatus that teaches relationships between members and subsets of a recognized set of living to non-living things, such as the five food groups through illustrations on the faces of the game apparatus. The apparatus also includes coded indicia in the form of letters, numbers, and colors, which provide additional information to aid in children recalling relationships between various members and subsets which are illustrated in the game apparatus.

The prior art does not disclose nor teach a method for teaching thinking skills and knowledge acquisition including making distinctions, organizing into and/or making systems, recognizing relationships, and taking perspectives.

SUMMARY OF THE INVENTION

A method of teaching thinking skills and knowledge acquisition using an educational toy is disclosed. In a first step, a user chooses at least one idea variable. In a second step, the user chooses a process from a group having a distinction process, a systems process, a relationships process, and a perspectives process. In a third step, the process is carried out on the idea variable. In a fourth step, the user determines whether any additional processes need to be carried out and if yes, the user returns to selecting a process.

DETAILED DESCRIPTION OF THE INVENTION

Figure 1:
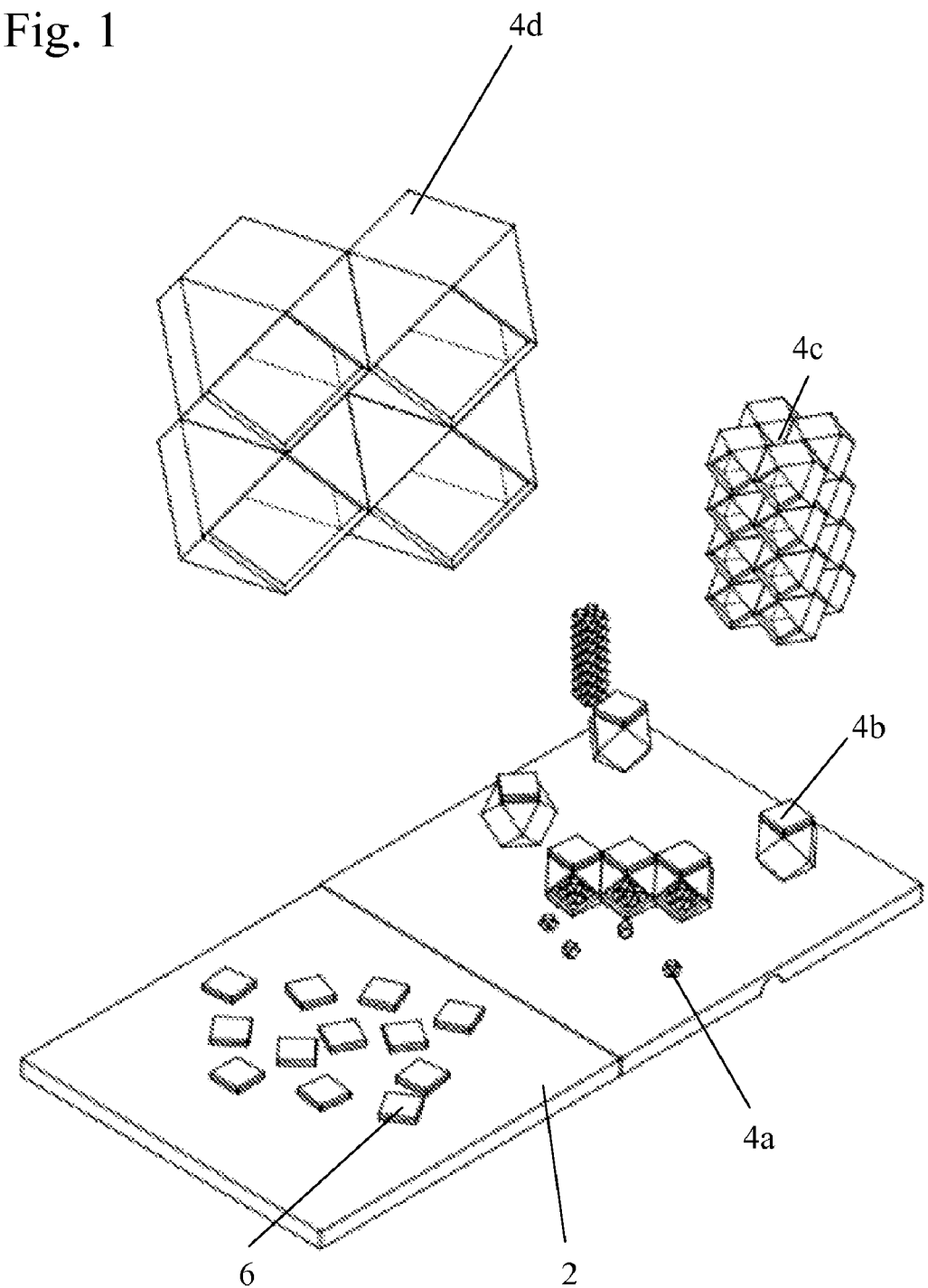
FIG. 1 shows a schematic of an educational toy system of a first embodiment of the present invention.
Figure 2:
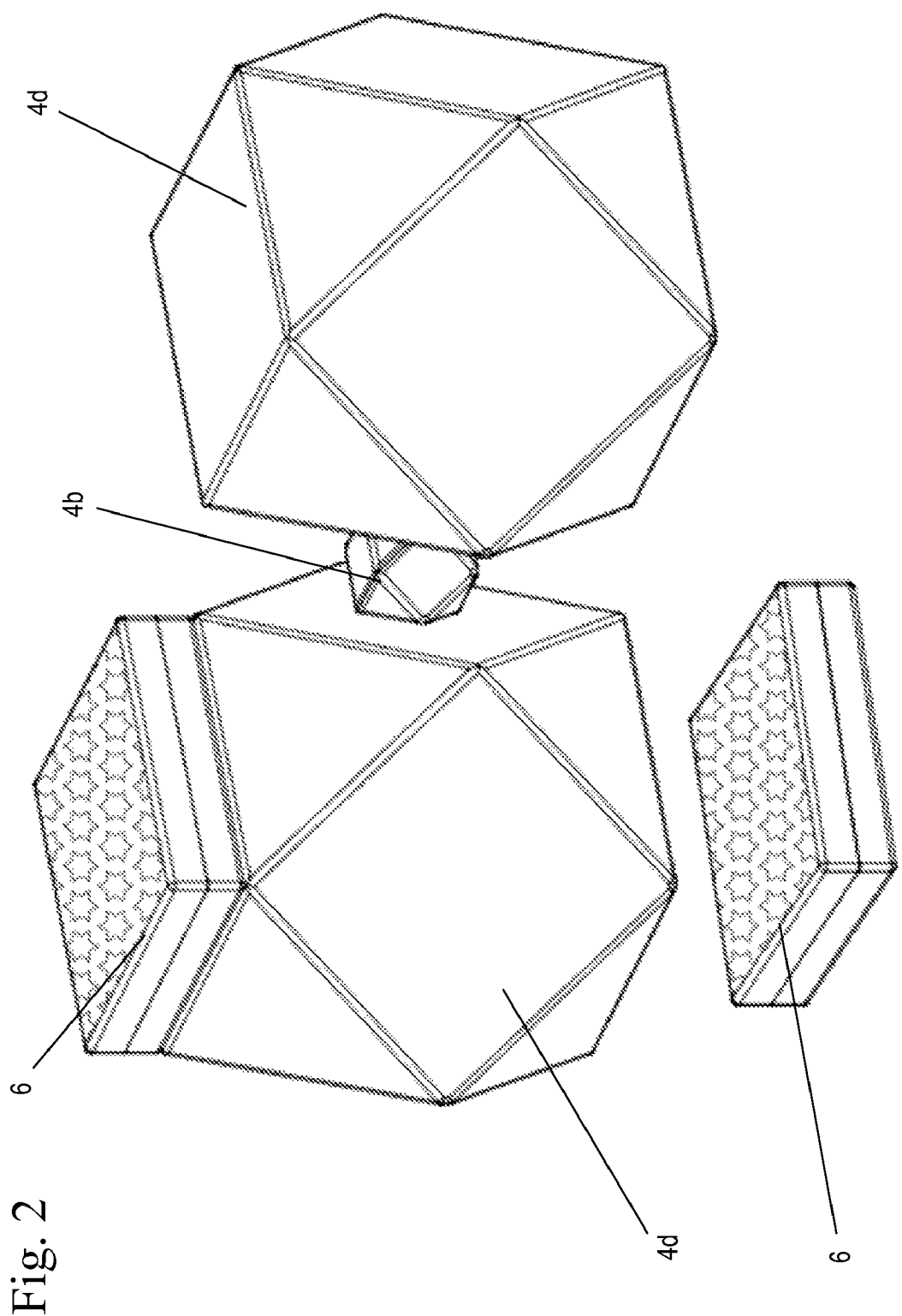
FIG. 2 shows a schematic of how distinctions are displayed on the educational toy system.
Figure 3:
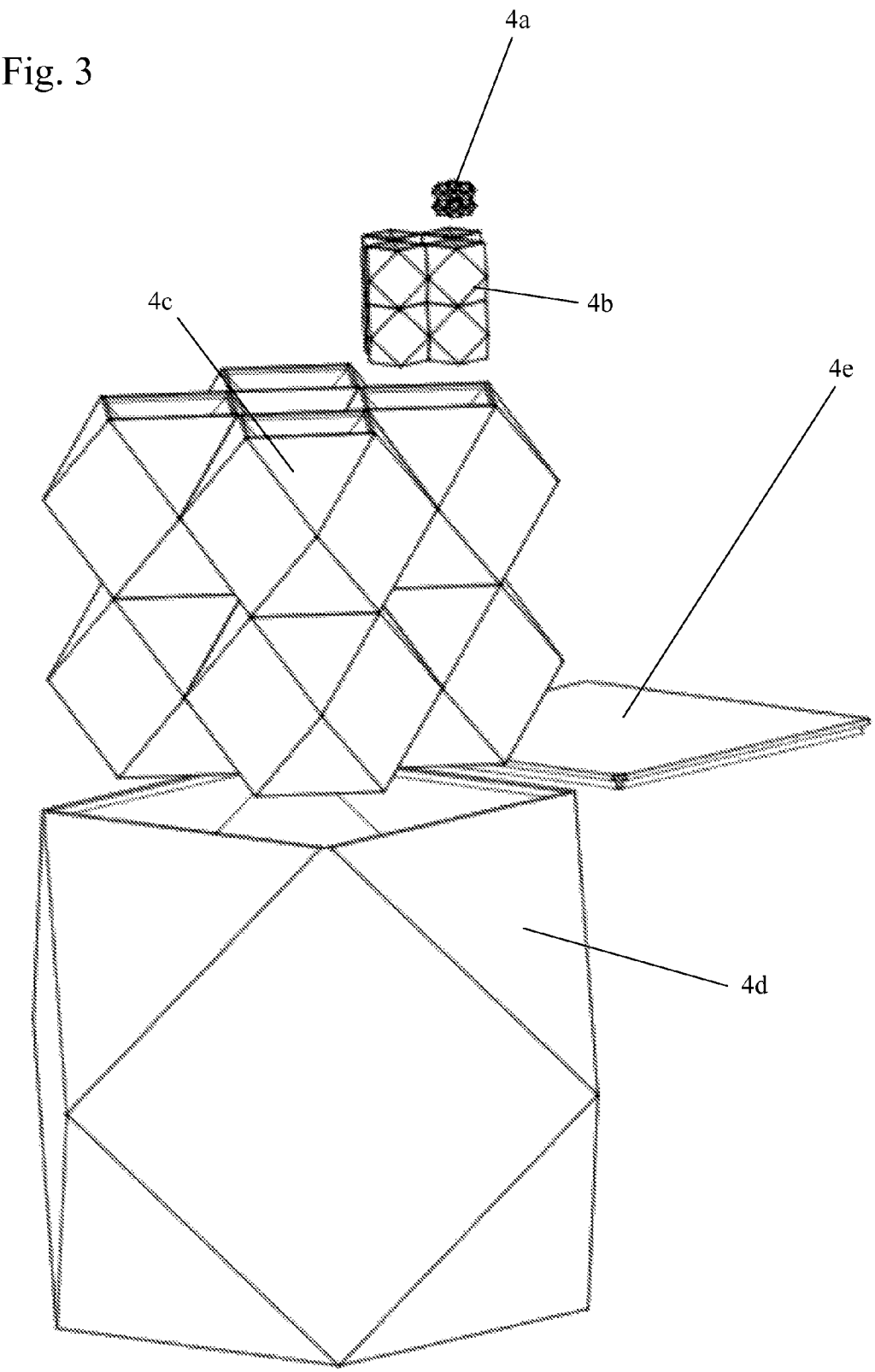
FIG. 3 shows a schematic of how systems are displayed on the educational toy system.
Figure 4:
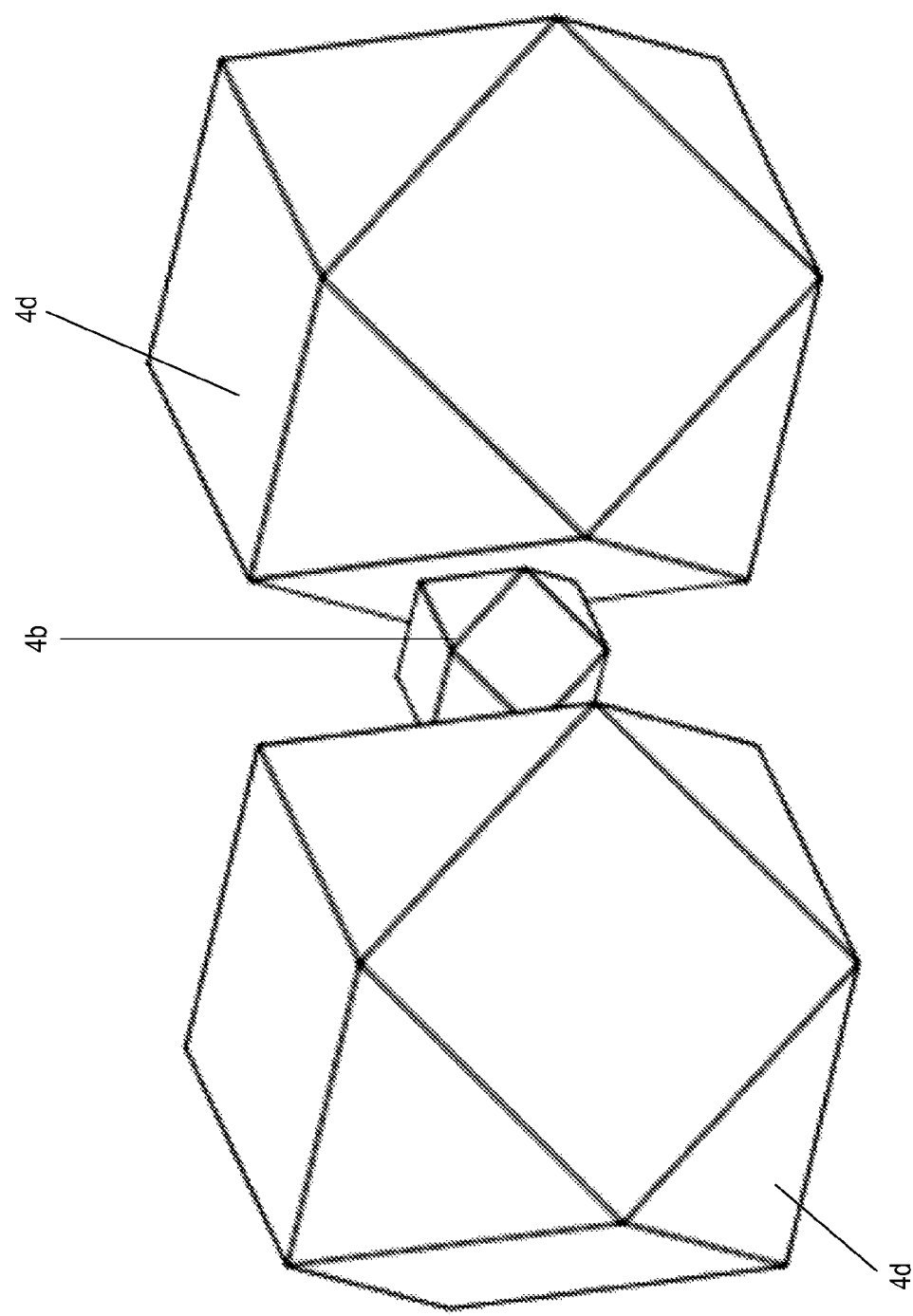
FIG. 4 shows a schematic of how relationships are displayed on the educational toy system.
Figure 5:
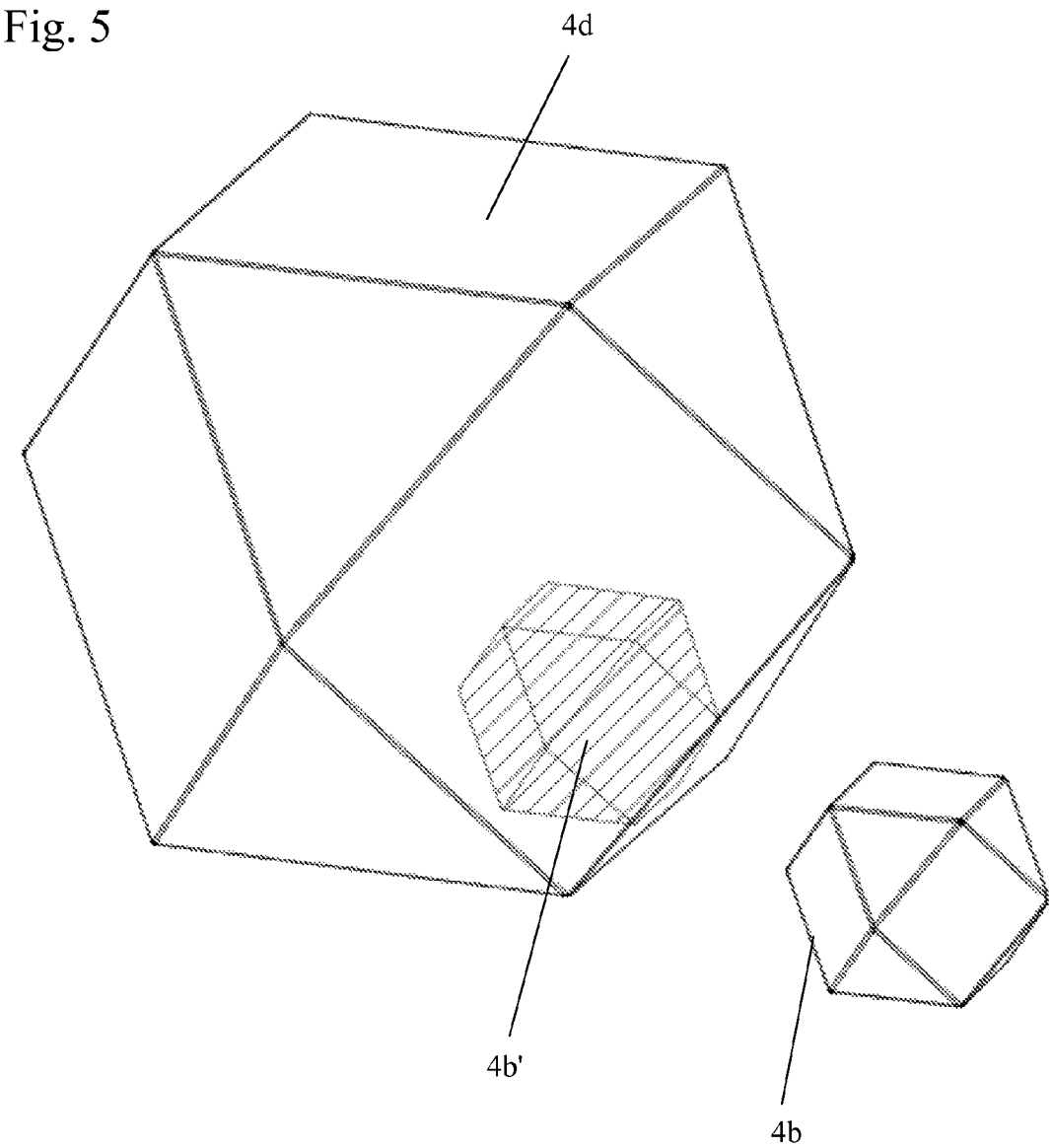
FIG. 5 shows a schematic of how perspective is displayed on the educational toy system.
Figure 6:
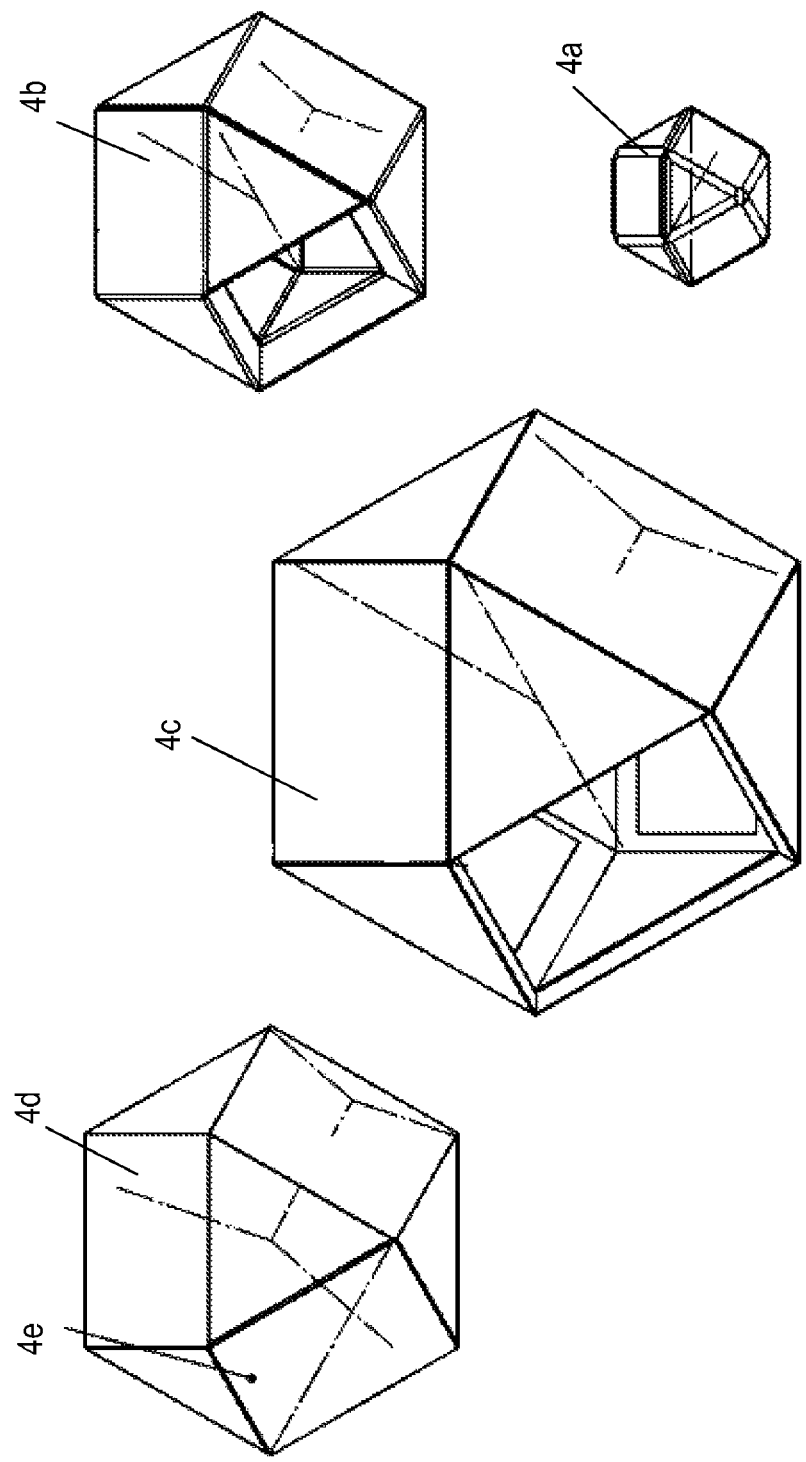
FIG. 6 shows scaled schematics of the different sized blocks of the educational toy system.

FIGS. 1 through 6 show an educational toy system of the present invention. The system includes a board 2, a series of multiple, different size blocks 4a, 4b, 4c, and 4d, and tiles 6. It should be noted that in FIG. 6, the small block 4a is shown in scale 4:1, the medium block 4b is shown in scale 2:1, the large block 4c is shown in scale 1:2, and the extra-large block 4d is shown in scale 1:4.

The board 2 of the educational toy system is preferably dry erasable, magnetic, and provides a platform for all of the other pieces of the educational toy system.

The blocks 4a, 4b, 4c, and 4d are all of self-similar shapes and in this example include at least four different sizes, small, medium, large, and extra-large. The term self-similar meaning that the shape is the same, although the sizes differ. With the exception of the smallest block 4a, all of the blocks 4b, 4c, 4d are preferably hollow with one open side. The blocks are sized such that a number of the lesser sized blocks fit into each subsequent greater sized block. For example, eight small blocks fit within one medium block and eight medium blocks fit within one large block and so on. The greatest sized block 4d preferably includes a transparent lid 4e for closing off the opening in the block and may serve to store all of the blocks together. Each of the blocks 4a, 4b, 4c, 4d has magnets on the faces of the blocks, preferably on each face. While the blocks 4a, 4b, 4c, 4d are shown as cuboctahedrons, other shapes with multiple faces may also be used, such as the cubes shown in FIG. 12. The outer surface of the blocks, besides being magnetic, are preferably markable and erasable, and also contain a reflective surface. The configuration of the magnets and the magnets themselves are strong enough to resolve polarity conflicts to allow specific connectivity patterns of the blocks 4a, 4b, 4c, 4d, such as stacking in towers, cube formation, wall formation, and other similar formations. Alternatively, the blocks may be connectable using hook and loop fasteners or means of connecting the blocks together.

The tiles 6 of the educational toy system are magnetic so that they can attach to the faces of the blocks 4a, 4b, 4c, and 4d. The tiles 6 are preferably markable and erasable and may have printed material present on at least one side of the tile 6.

It should be noted that the shape, specific number of blocks able to fit within the next greater sized block, the number of blocks of each size provided, and the sizes of the blocks are all shown as examples and may vary.

Figure 12:
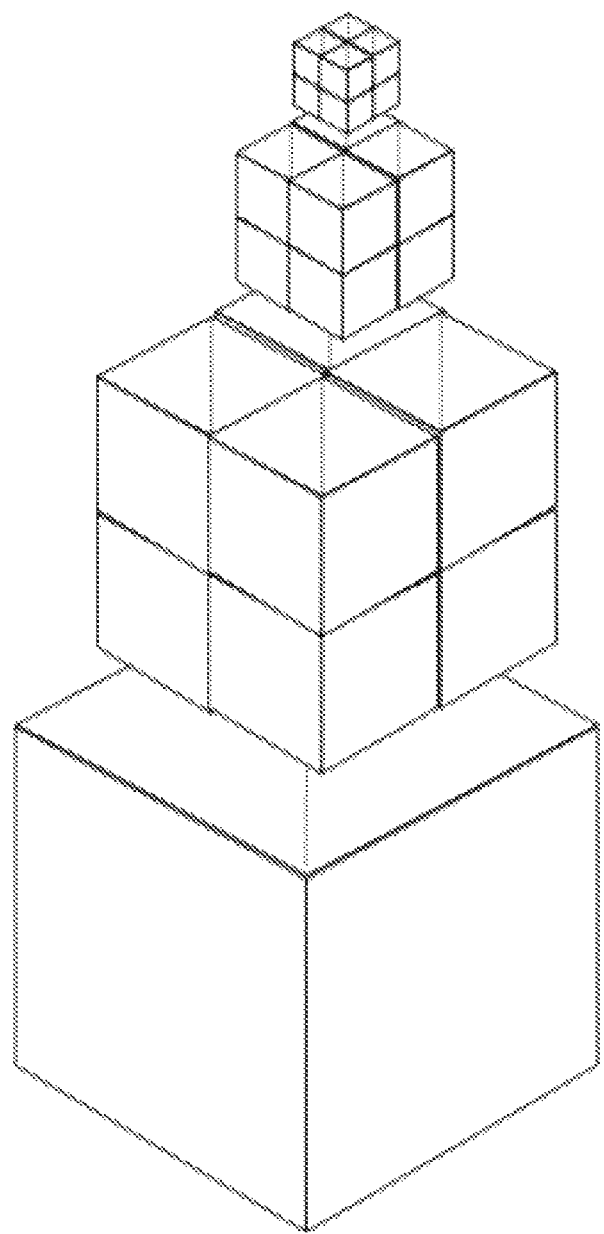
FIG. 12 shows an educational toy system of a second embodiment of the present invention including cubes.

While the blocks are shown to be cuboctahedrons, other shaped blocks, such as the cubes shown in FIG. 12 may also be used.

Figure 13:
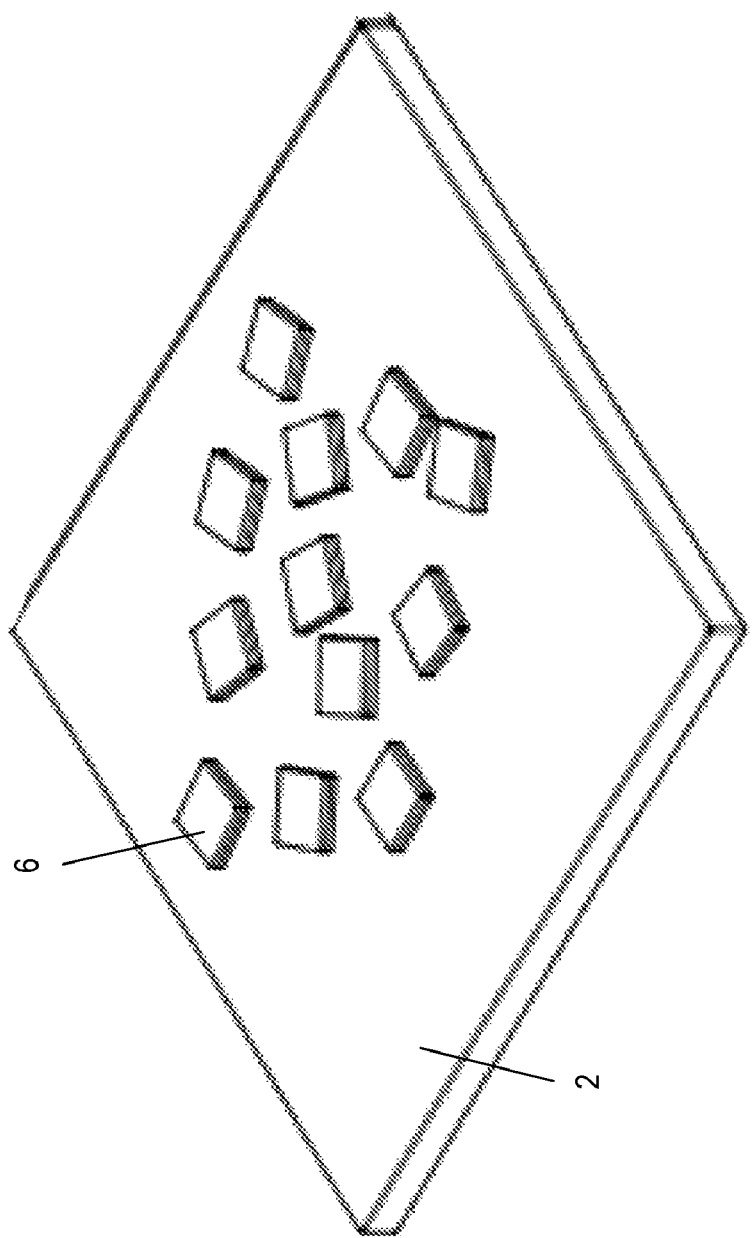
FIG. 13 shows an educational toy system of a third embodiment of the present invention.
Figure 14:
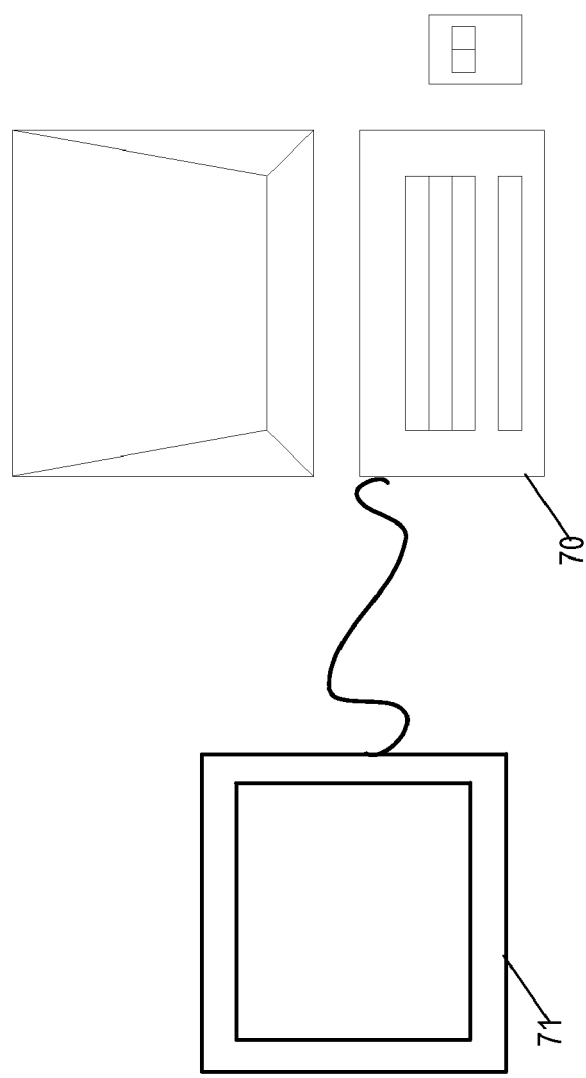
FIG. 14 shows an educational toy system of a fourth embodiment of the present invention.

Other educational toy systems that may be used are shown in FIGS. 13 and 14.

In the educational toy system of the third embodiment, as shown in FIG. 13, a marker 8, a plurality of tiles 6, and a board 2 are present.

The marker 8 is defined as any instrument that can label or write. The tiles 6 of the educational toy system may be magnetic so that they can attach to the board 2. The tiles 6 are preferably markable and erasable and may have printed material present on at least one side of the tile 6

The board 2 of the educational toy system is preferably dry erasable, magnetic, and provides a platform for all of the other pieces of the educational toy system.

Alternatively, the educational toy system may only include the marker 8, the tiles 6, and some writable surface for receiving the tiles, for example paper.

Figure 9:
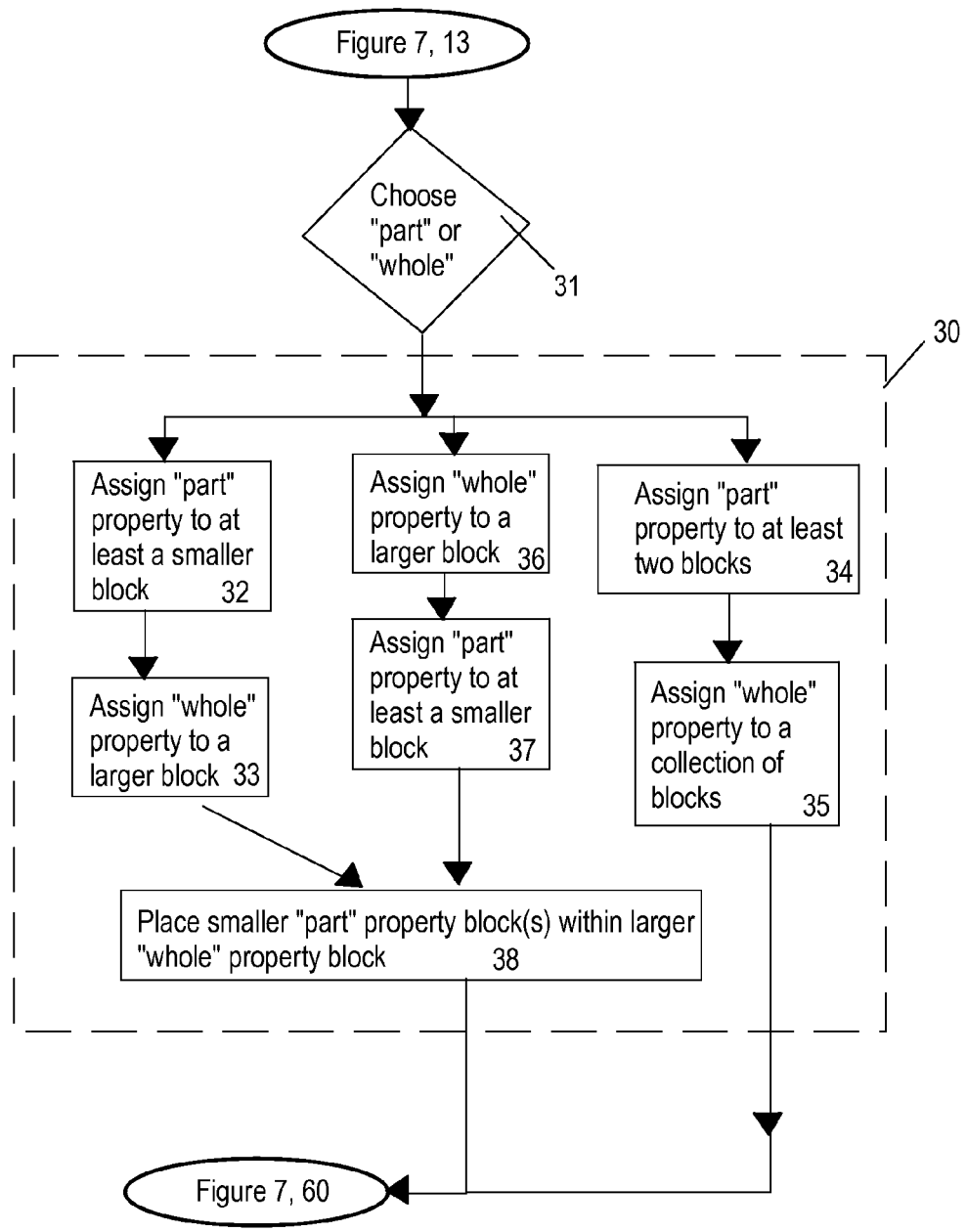
FIG. 9 shows steps for organizing into and/or making systems regarding an idea variable using the educational toy system.
Figure 10:
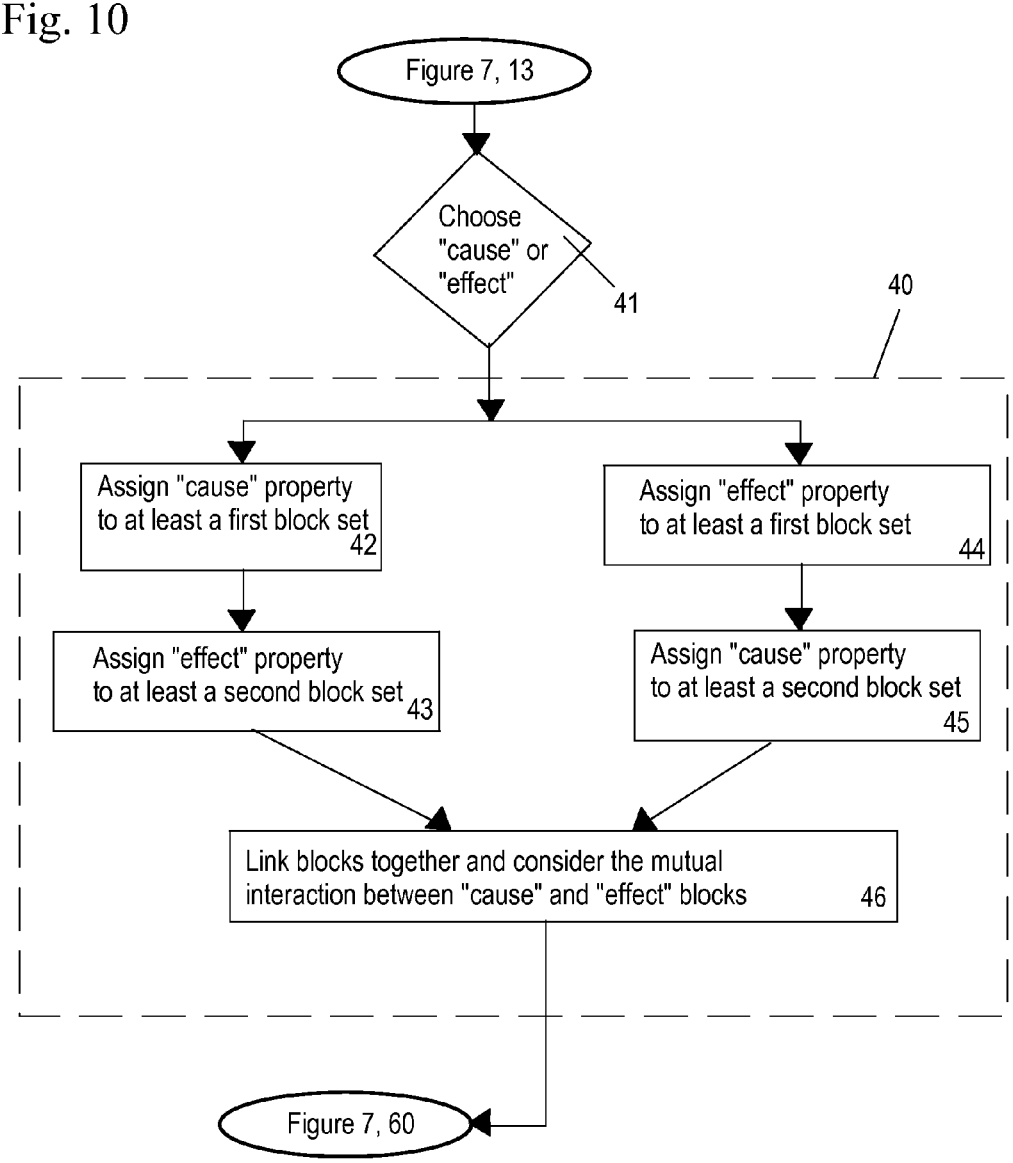
FIG. 10 shows steps for recognizing relationships about and/or including the idea variable using the educational toy system.

In the educational toy system as shown in FIG. 13, different written symbols may correspond to physical actions in the educational toy systems of FIGS. 1-6 and 12. For example, drawing circles using the marker 8 on the board 2 around a group of tiles 6 or words would be equivalent to placing smaller blocks into the larger blocks 38 or vice versa as shown in FIG. 9. Drawing connecting lines between tiles 6 or words would be equivalent to linking the blocks together in step 46 as shown in FIG. 10. Affixing or marking any type of symbol such as letters or words on the tiles 6 using the marker 8 would be equivalent to comparing and contrasting "identity" and "other" in step 26 of FIG. 8. Drawing a dot, or an eye (circle with a dot) with the marker 8 on the board 2 is equivalent to considering the "object" block from the point of view of the "subject" block in step 56 of FIG. 11.

An educational toy system of a fourth embodiment is shown in FIG. 14. FIG. 14 provides a computer implementation of the educational toys system that includes a computer 70, a tablet 71, and pen 72. The pen is comparable to a FLY™ pen. Written symbols used with the educational toy system of FIG. 13 corresponding to the physical actions in other toy systems would also be used with the pen 72 and the tablet 71 and would be interpreted by the computer 70. For example, drawings circles around symbols, virtual tiles, or words using the pen 72 on the tablet 71 would be interpreted by the computer 70 to be equivalent to placing smaller blocks into the larger blocks 38 or vice versa as shown in FIG. 9. Drawing connecting lines between the symbols, virtual tiles, or words using the pen 72 on the tablet 71 would be interpreted by the computer 70 to be equivalent to linking the blocks together in step 46 as shown in FIG. 10. Marking any of type of marking such as letters or words on the symbols, virtual tiles, or words using the pen 72 on the tablet 71 would be interpreted by the computer 70 to be equivalent to comparing and contrasting "identity" and "other" in step 26 of FIG. 8. Drawing a dot, or an eye (circle with a dot) with the pen 72 on the tablet 71 would be interpreted by the computer 70 to be equivalent to considering the "object" block from the point of view of the "subject" block in step 56 of FIG. 11.

Methods of teaching thinking skills and knowledge acquisition using the educational toy systems shown in FIGS. 1-6, 12, 13, and 14 are shown in FIGS. 7 through 11. The method of the present invention breaks down concepts into two parts, content and context, with the content being what we see, hear, or read—symbols, images, or words, and context being the invisible underlying patterns. The method of the present invention uses the educational toy system to make the invisible contextual underlying patterns visible, tactile, and conscious.

The four underlying patterns of context made visible, tactile, and conscious using the educational toy system and the method of the present invention are (1) making distinctions, (2) recognizing relationships, (3) organizing systems, and (4) taking perspectives.

Figure 7:
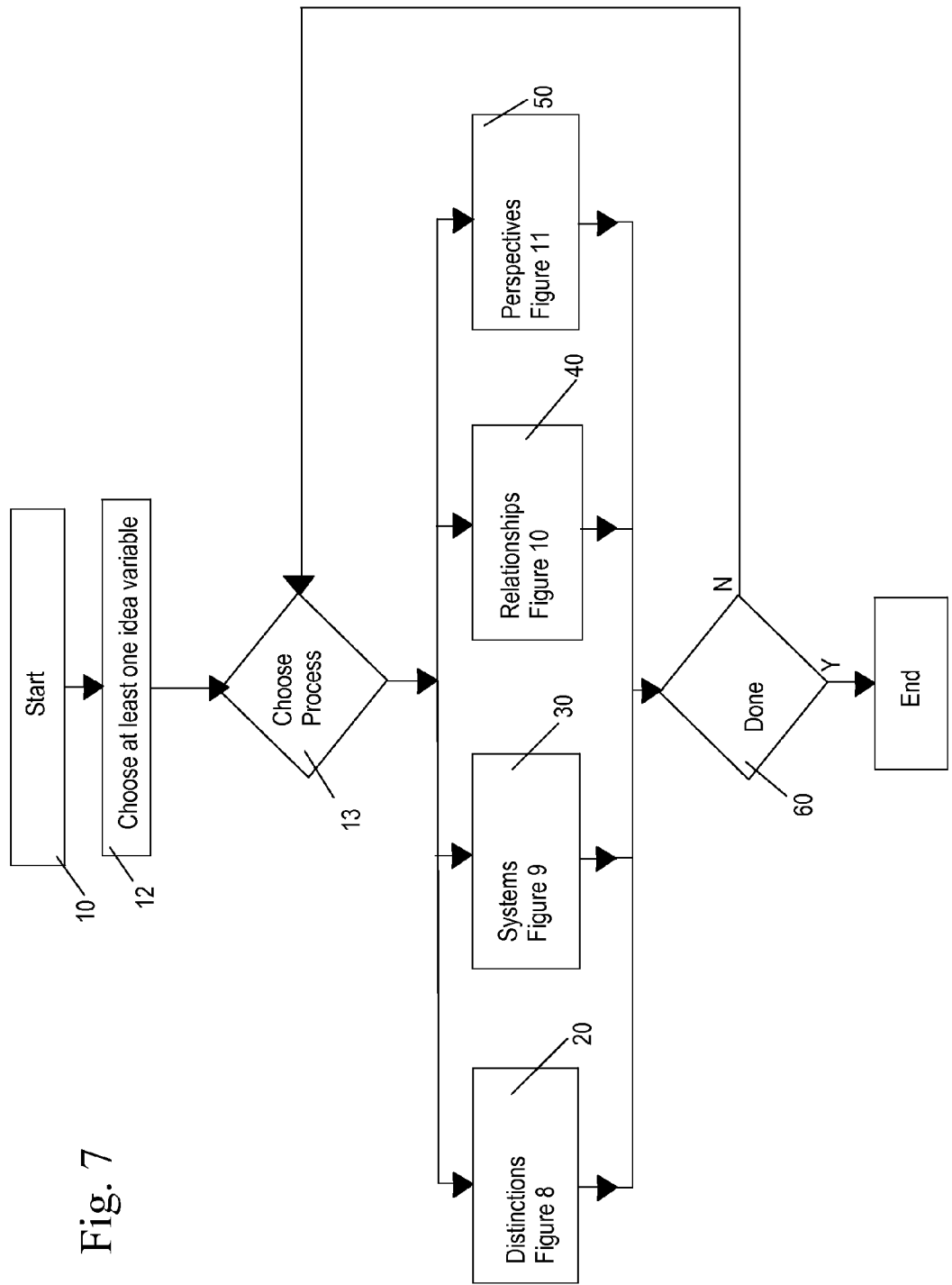
FIG. 7 shows a flow chart of the method of teaching thinking skills and knowledge acquisition using an educational toy system.

As shown in FIG. 7, by providing an educational toy system in a first step 10, choosing at least one idea variable in a second step 12, and then choosing which process or pattern of context to proceed with in a third step 13. The patterns include making distinctions regarding the idea variable using the educational toy system 20, organizing into and/or make systems of the idea variable using the educational toy system 30, making relationships about and including the idea variable using the educational toy system 40, and taking perspective of the idea variable using the educational toy system 50. Steps 20, 30, 40, and 50 are non-linear and may happen simultaneously for the user. After steps 20, 30, 40, and/or 50 are performed, in step 60, the user decides whether they are done or not in step 60. If the user is done, the method ends 61. If the user is not done, then the user goes back to step 13 and decides which of the four processes to do. The method may be repeated an infinite number of times. Steps 20, 30, 40, and 50 are parallel and recursive. The output 60 from steps 20, 30, 40 and 50 will change based on the step 20, 30, 40, or 50 that was carried out previously allowing the user to make the invisible contextual underlying patterns visible, tactile, and conscious.

Making Distinctions

In making distinctions regarding the idea variable using the educational toy system in step 20, "identity" and "other" are made to be visible, tactile, and conscious. Examples of "identity" and "other" are this and that; us and them; in and out. Or questions such as, aiding in answering questions such as what constitutes art? And what constitutes life? Making distinctions teaches that the "identity" of a thing or an idea variable is a function of how it relates to "other" things or idea variables.

Figure 8:
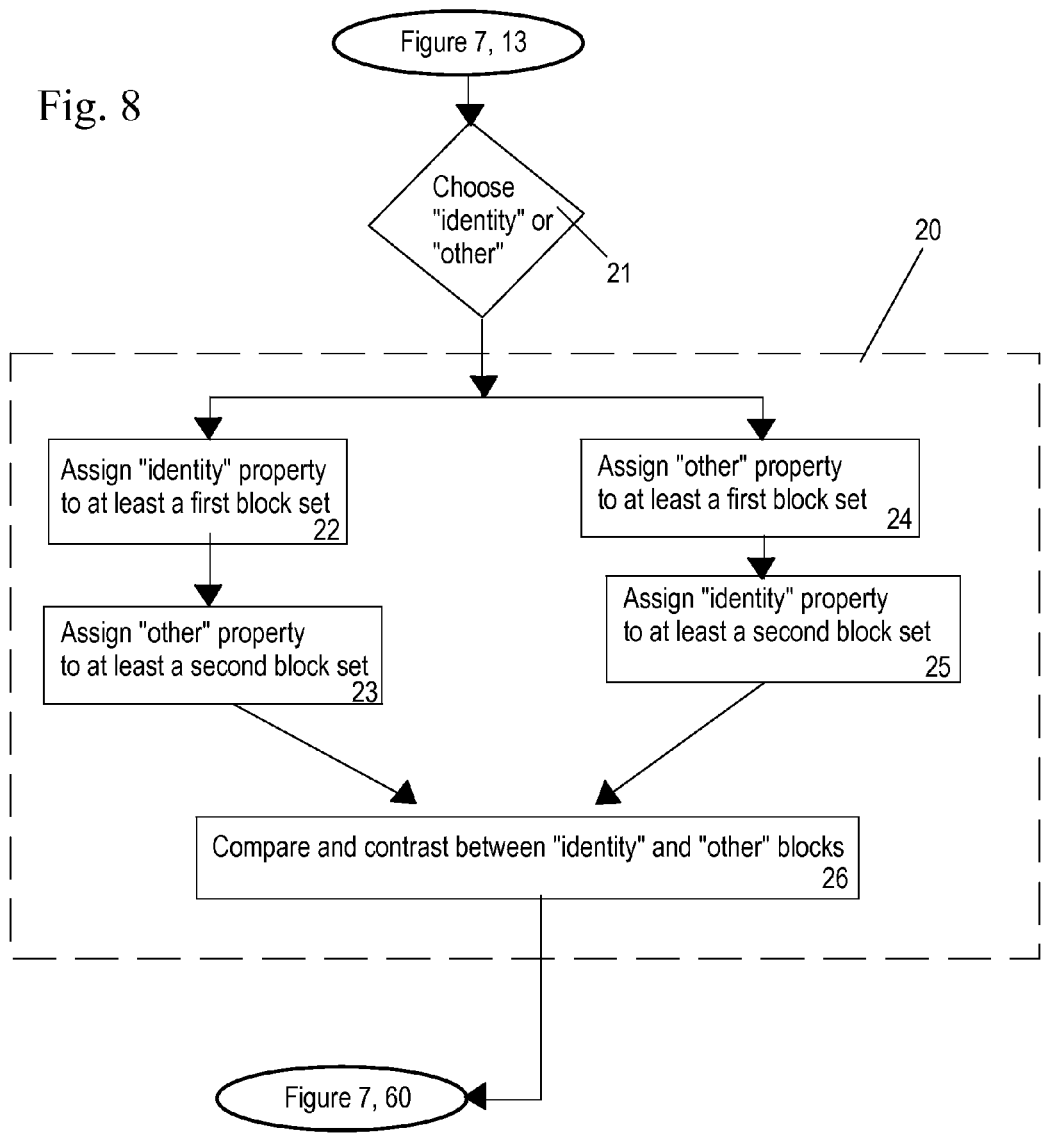
FIG. 8 shows steps for making distinctions regarding an idea variable using the educational toy system.

As shown in FIG. 8, making distinctions 20 regarding the idea variable using the educational toy system includes a first step 21 of choosing whether to start with "identity" or "other". If the user chooses to assign "identity" first, then the user follows the left most path shown and assigns "identity" to a block or tile(s) in step 22 and then assigns "other" to a different block or tile(s) in step 23. From step 23, the user would compare and contrast between "identity" and "other" in step 26 and return to step 60 of FIG. 7 to decide whether they were done or not.

If the user chooses to assign "other" first, then the user follows the right most path shown and assigns "other" to a block or tile(s) in step 24 and then assigns "identity" to a different block or tile(s) in step 25. From step 25, the user would then compare and contrast between "identity" and "other" and return to step 60 of FIG. 7 to decide whether they were done or not.

Comparing and contrasting of "identity" and "other" in step 26 within the educational toy system of FIGS. 1-6 and 12 would include affixing tiles to the blocks or writing labels on the tiles or blocks themselves. The comparing and contrasting of "identity" and "other" of step 26 using the educational toy systems of FIGS. 13 and 14 would include any way of differentiating tiles from each other. This differentiating may include but is not limited to writing directly on the tile or block—letters, symbols, numbers, etc . . . , using the pen 72 or marker 8 or affixing some type of distinguishing object.

Organizing into Systems

In organizing into and/or making systems of the idea variable using the educational toy system 30, "part" and "whole" are made to be visible, tactile, and conscious. Examples of "part" and "whole" are a family is a system comprised of people; each person is thus part of the family; a person is made up of various systems of bones, muscles, etc. Organizing into systems teaches that all systems are comprised of "parts" and "wholes" and that every "whole" is comprised of "parts" and every "part" is a "whole".

As shown in FIG. 9, organizing into and/or making systems regarding the idea variable using the educational toy system includes a first step of choosing whether to start with "part" or "whole". If the user chooses to assign "whole" first, then the user follows the right most path shown and assigns "whole" to a larger block in step 36 and then assigns "part" to a smaller sized block in step 37. From step 37, the user would place the "parts" within the "whole" in step 38 and return to step 60 of FIG. 7 to decide whether they were done or not.

If the user chooses to assign "part" first, then the user may choose from steps 32 and 33 or 34 and 35. In step 32, the user assigns "part" to a smaller block and then in step 33, the user assigns "whole" to a larger block. From step 33, the user would placed the "parts" within the "whole in step 38 and return to step 60 of FIG. 7 to decide whether they were done or not. Alternatively, in step 34, the user assigns "part" to at least two blocks or and then in step 35, the user assigns "whole" to a collection of blocks. From step 35, the user would return to step 60 of FIG. 7 to decide whether they were done or not.

Placing the "parts" within the "whole" in step 38 within the educational toy system of FIGS. 1-6 and 12 would include nesting the smaller blocks within the larger blocks. The placing of the "parts" within the "whole" in step 38 using the educational toy systems of FIGS. 13 and 14 would include drawing circles using the marker 8 on the board 2 around a group of tiles or using the pen 72 to draw circles on the tablet 71.

Making Relationships

In making relationships about and including the idea variable using the educational toy system in step 40, "cause" and "effect" are made to be visible, tactile, and conscious. For example, if the conceptual relationship between a boy and girl is "sibling", the relationship alters the identity of the boy to brother and the girl to sister. Without a sibling, one cannot be identified as a brother or a sister. Making relationships teaches how to make implicit relationships explicit.

As shown in FIG. 10, making relationships about and including the idea variable using the educational toy system 40 includes a first step 41 of the user choosing "cause" or "effect". If the user chooses to assign "cause" first, then the user follows the left most path shown and assigns "cause" to a block or tile(s) in step 42 and then assigns "effect" to a different block or tile(s) in step 43. From step 43, the user would link the blocks together and consider the mutual interaction between the "cause" and "effect" in step 46 and return to step 60 of FIG. 7 to decide whether they were done or not.

If the user chooses to assign "effect" first, then the user follows the right most path shown and assigns "cause" to a block or tile(s) in step 44 and then assigns "cause" to a different block or tile(s) in step 45. From step 45, the user would link the blocks together and consider the mutual interaction between the "cause" and "effect" in step 46 and return to step 60 of FIG. 7 to decide whether they were done or not.

Considering the mutual interaction between "cause" and "effect" in step 46 within the educational toy system of FIGS. 1-6 and 12 would include linking the blocks together magnetically with another block. The consideration of the mutual interaction between "cause" and "effect" in step 46 using the educational toy systems of FIGS. 13 and 14 would be drawings connecting lines between the tiles 6 either on the tablet 71 or on the board using the pen 72 or marker 8.

Taking Perspective

In taking perspective of the idea variable using the educational toy system in step 50, "subject" and "object" are made to be visible, tactile, and conscious. Examples of "subject" and "object" different people's interpretation of a movie, political, event or war or happiness from a historical, moral or scientific perspective. Perspective taking teaches that every idea variable is a function of the point of view from which it is concerned and that any idea variable can occupy the portion of the "subject" (point) or an "object" (view).

Figure 11:
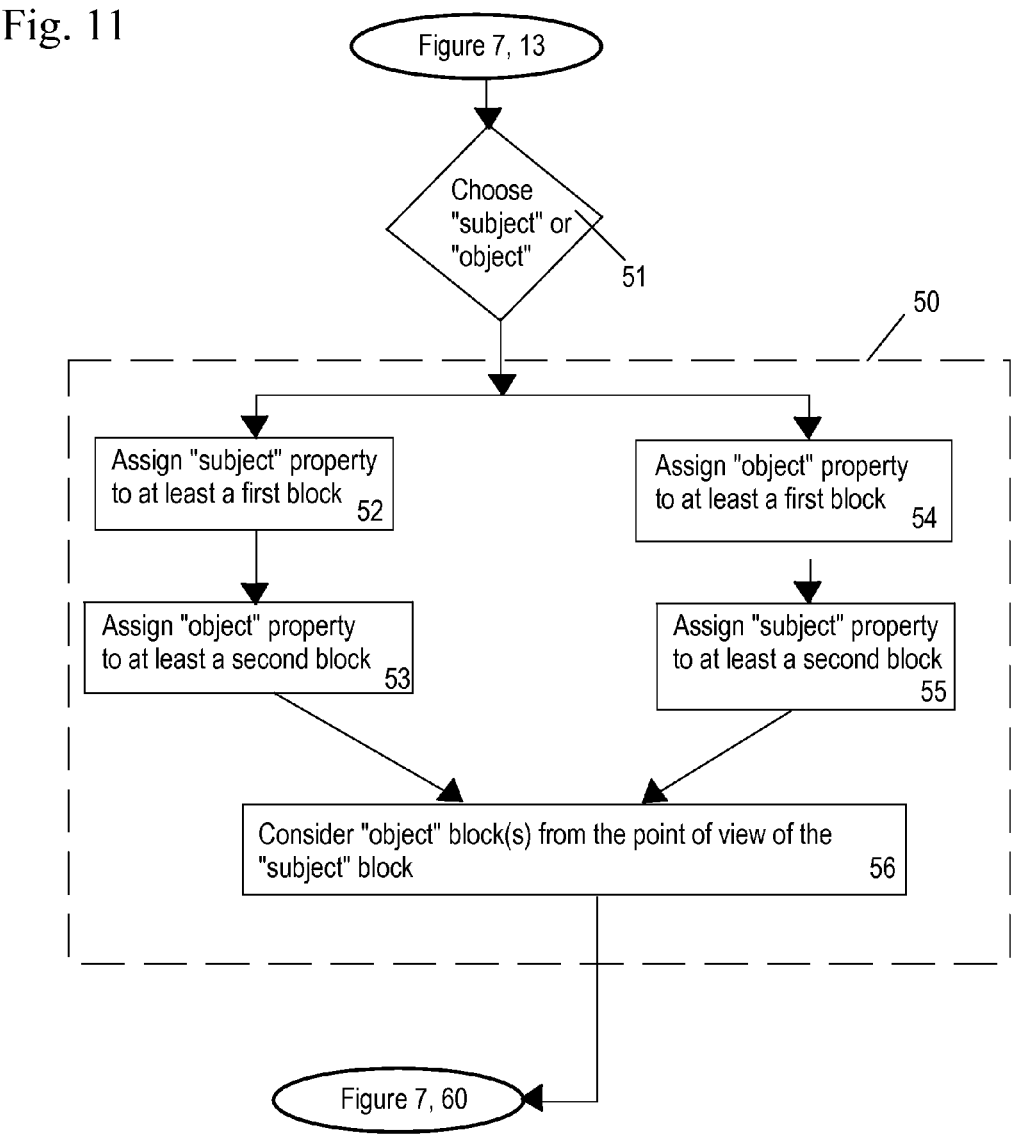
FIG. 11 shows steps for taking perspective of the idea variable using the educational toy system.

As shown in FIG. 11, taking perspective 50 regarding the idea variable using the educational toy system includes a first step 51 of choosing whether to start with "subject" or object". If the user chooses to assign "subject" first, then the user follows the left most path shown and assigns "subject" to a block or tile(s) in step 52 and then assigns "object" to a different block or tile(s) in step 53. From step 53, the user would consider the "object" from the point of view of the "subject" in step 56 and return to step 60 of FIG. 7 to decide whether they were done or not.

If the user chooses to assign "object" first, then the user follows the right most path shown, and assigns "object" to a block or tile(s) in step 54 and then assigns "subject" to a different block or tile(s) in step 55. From step 55, the user would consider the "object" from the point of view of the "subject" in step 56 and return to step 60 of FIG. 7 to decide whether they were done or not.

Considering the "object" from the point of view of the "subject" in step 56 using the educational toy systems of FIGS. 1-6 and 12 would include placing a blocks within view of each other. At least one of blocks preferably has reflective properties. The consideration of the "object" from the point of view of the "subject" in step 56, using the educational toy systems of FIGS. 13 and 14 would be drawing a dot or an eye (circle surrounding a dot) between the "subject" and "object" using the marker 72 or pen 8.

The example provided below show the recursive application of steps 20, 30, 40, and 50 to make the invisible contextual underlying patterns visible, tactile, and conscious.

EXAMPLE 1

Assuming that the idea variable is "intellectual property", in step 12, in step 13, the user chooses which process to start with. In this example, the user choose step 20 of distinctions. Then in step 21 decides whether to assign "identity" or "other" first. In this case, the user chooses to assign "identity" to a first block set in step 22, which in this case is "patent". As part of identifying "patent" the user may determine the properties that a "patent" possesses—such as a) cannot be renewed; b) grant of property right to an inventor to prevent others for making, using, or selling; c) for an invention; d) 20 year term. As part of assigning the property of "other" to a second block set in step 23, the user may determine properties that "other" or in this case a "trademark" possesses,—such as a) identifies source of goods or services in commerce; b) term of 10 years; c) renewable; d) prevents others from using a confusingly similar mark. Then, the user compares and contrasts between the "identity" and "other" or "patent" and "trademark" blocks in step 26. From the step 26, the user moves to step 60 and decides whether they are done making distinctions. If they are, then the method ends. If not, then the user returns to step 13 of choosing the same process just carried out or a different process.

EXAMPLE 2

Assuming that the idea variable is "intellectual property", in step 12, in step 13, the user chooses which process to start with. In this example, the user choose step 30 of systems. Then in step 31 decides whether to assign "part" or "whole" first. In this case, the user chooses to assign "whole" or "intellectual property" to an extra-large size block in step 36. In step 37, the user determines what makes up "intellectual property"—such as patents, trademarks, and copyrights and each of the "parts" of "intellectual property" are assigned to large blocks in step 37. Then in step 38, the "parts" or the large blocks of patents, trademarks, and copyrights are placed inside of the "whole" or extra large block of "intellectual property". From the step 38, the user moves to step 60 and decides whether they are done making systems. If they are, then the method ends. If not, then the user returns to step 13 of choosing the same process just carried out or a different process.

EXAMPLE 3

Assuming that "patent" is the idea variable in step 12, in step 13, the user chooses which process to start with. In this example, the user chooses step 40 of relationships. Then in step 41, the user decides whether to assign "cause" or "effect" first. In this case, the user chooses to assign "cause" or "patent" to a first block in step 42. In step 43, the user assigns "effect" or right(s) to another block. Then, in step 46, the blocks of "patent" and "right(s)" are linked together using a smaller magnetic block and the mutual interaction between the "patent" and "right(s)" blocks are considered. From step 46, the user moves to step 60 and decides whether they are done making systems. If they are, then the method ends. If not, then the user returns to step 13 of choosing the same process or a different process.

EXAMPLE 4

Assuming that "patent" is the idea variable in step 12, in step 13, the user chooses which process to start with. In this example, the user chooses step 50 of perspective. Then in step 51, the user decides whether to assign "subject" or "object" first. In this case, the user chooses to assign "subject" or "patent"—as it relates to being an asset to a first block in step 52. In step 53, the user assigns "object" or "patent"—as a tool for preventing someone from making, using, or selling. Then, in step 56, the "object" or "patent"—as it relates to being a tool for preventing someone from making, using, or selling is looked at from the point of view of the "subject" or a "patent" as it relates to being an asset. From step 56, the user moves to step 60 and decides whether they are done making systems. If they are, then the method ends. If not, then the user returns to step 13 of choosing the same process or a different process.

It should be noted that while the examples above contain only one process, these examples may be linked to each other and the examples may include various processes. All of the processes may be repeated numerous times.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:
1. A method of teaching thinking skills and knowledge acquisition using an educational toy comprising: a plurality of self-similar, multiple sized blocks with a plurality of faces, at least one larger sized block being hollow with at least one open face, the blocks being connectable into patterns and sized such that multiples of a smaller size block may fit within a larger sized block, and a plurality of tiles for magnetically attaching to the faces of blocks, the method comprising:
 a) choosing an idea variable shown on the plurality of tiles;
 b) choosing a process from a group consisting of:
  i) distinctions comprising:
   A) choosing an identity property and an other property;

B) assigning the identity property to a first block and the other property to a second block; and C) comparing and contrasting the identity property block and the other property block by differentiating the blocks through magnetically attaching tiles onto the plurality of faces of the blocks;

ii) systems comprising:

A) choosing a part property and a whole property;

B) assigning the part property to at least one smaller block and the whole property to at least one larger block; and C) assembling the part property smaller blocks within the at least one whole property larger block; and iii) relationships comprising:

A) choosing a cause property and an effect property;

B) assigning the cause property to a first block and the effect property to a second block; and C) assembling and magnetically connecting the first and second block together and considering the mutual interaction between the cause property block and the effect property block through magnetic faces of the blocks;

c) determining whether any additional processes need to carried out and if yes, returning to step b).

2. The method of claim 1, wherein the group in step b) further comprises iv) perspectives.

3. The method of claim 2, wherein the process of perspectives comprising:

A) choosing a subject property and an object property;

B) assigning the subject property to a first block and the subject property to a second block;

C) turning a reflective surface on the object property block or the subject property block to face the other of the object property block or the subject property block and magnetically attach tiles onto the reflective surface of the object property block or the subject property block and to the face of the other of the object property block or the subject property block.

4. The method of claim 1, wherein in step b)i)C) the tiles and the faces of the plurality of faces of the blocks in which written indicia is placed are dry erasable.

5. The method of claim 1, wherein the tiles have printed indicia on at least one surface.

6. The method of claim 1, wherein in step b)iii)C) the blocks are connectable into patterns by magnets.

\* \* \* \* \*